United States Patent
Hasinovic

(10) Patent No.: US 8,772,399 B2
(45) Date of Patent: Jul. 8, 2014

(54) FLEXIBLE PROTECTIVE AND LUSTROUS SPRAY GEL DRESSING COMPOSITION

(75) Inventor: Hida Hasinovic, Lexington, KY (US)

(73) Assignee: Ashland Licensing and Intellectual Property, LLC

( * ) Notice: Subject to any disclaimer, the term of this patent is extended or adjusted under 35 U.S.C. 154(b) by 960 days.

(21) Appl. No.: 12/399,299

(22) Filed: Mar. 6, 2009

(65) Prior Publication Data

US 2009/0253862 A1   Oct. 8, 2009

Related U.S. Application Data

(60) Provisional application No. 61/131,124, filed on Jun. 3, 2008, provisional application No. 61/123,302, filed on Apr. 7, 2008.

(51) Int. Cl.
- C08F 220/00   (2006.01)
- C08G 77/04   (2006.01)
- C09D 133/02   (2006.01)
- C09D 133/04   (2006.01)

(52) U.S. Cl.
USPC ........... 524/502; 510/241; 510/244; 510/417; 510/434; 510/477; 524/501; 524/556; 524/560; 524/731

(58) Field of Classification Search
USPC .......... 510/244, 241, 417, 434, 477; 524/501, 524/556, 502, 731, 560
See application file for complete search history.

(56) References Cited

U.S. PATENT DOCUMENTS

| | | |
|---|---|---|
| 4,509,981 A | 4/1985 | Sanders, Jr. et al. |
| 4,880,557 A | 11/1989 | Ohara et al. |
| 5,183,845 A | 2/1993 | Parkinson et al. |
| 5,217,758 A | 6/1993 | Greenleaf et al. |
| 5,326,387 A | 7/1994 | Faber et al. |
| 5,399,205 A | 3/1995 | Shinohara et al. |
| 5,433,890 A | 7/1995 | Meyer et al. |
| 5,462,587 A | 10/1995 | Greenleaf et al. |
| 5,507,969 A | 4/1996 | Shinohara et al. |
| 5,520,843 A | 5/1996 | Wright |
| 5,661,208 A | 8/1997 | Estes |
| 5,693,704 A | 12/1997 | Estes |
| 5,700,312 A | 12/1997 | Fausnight et al. |
| 5,782,962 A | 7/1998 | Burke et al. |
| 5,866,532 A | 2/1999 | Jackson et al. |
| 5,913,969 A | 6/1999 | Howe |
| 6,013,323 A * | 1/2000 | Klayder et al. ............... 427/384 |
| 6,090,767 A | 7/2000 | Jackson et al. |
| 6,206,956 B1 | 3/2001 | Muntz et al. |
| 6,221,433 B1 | 4/2001 | Muntz et al. |
| 6,221,833 B1 | 4/2001 | Colurciello, Jr. |
| 6,227,200 B1 | 5/2001 | Crump et al. |
| 6,342,556 B1 | 1/2002 | Batdorf et al. |
| 6,494,767 B2 | 12/2002 | Fisher |
| 6,685,765 B1 | 2/2004 | Ghodoussi |
| 6,933,268 B2 | 8/2005 | White |
| 7,074,262 B2 | 7/2006 | Huang et al. |
| 7,378,382 B2 * | 5/2008 | Serobian et al. ............. 510/466 |
| 7,381,249 B2 * | 6/2008 | Hasinovic et al. ............. 106/10 |
| 7,399,738 B1 * | 7/2008 | Serobian ...................... 510/241 |
| 2002/0161105 A1 | 10/2002 | Rogers et al. |
| 2007/0010607 A1 * | 1/2007 | Smith et al. .................. 524/366 |
| 2007/0178321 A1 | 8/2007 | Haas |

OTHER PUBLICATIONS

Noveon, Inc., Bulletin 13: Emulsification Properties, Jan. 2002.

* cited by examiner

*Primary Examiner* — Satya Sastri

(74) *Attorney, Agent, or Firm* — Wood, Herron & Evans, LLP

(57) ABSTRACT

A protective dressing composition which imparts a lustrous and glossy appearance to a flexible or elastic rubber or plastic surface includes water, silicone fluid, a polymeric acrylic emulsifier to hold the silicone fluid in dispersion in the water and a UV stabilizer. Further, the composition is substantially free of nonpolymeric surfactants. The coating does not exhibit stickiness, attract dust or other contaminants, and resist cracking and peeling. The composition provides of a shiny protective coating suitable for application to metal, plastic, wood, and painted surfaces, and is especially well suited for use on flexible substrates such as automotive tires, bumpers, rubber, trim, vinyl, and the like. The coating maintains the flexibility of the coating at low temperatures and reduces and/or eliminates the tacky property on the surface. The acrylic polymer emulsifier does not re-emulsify with rain (water) providing a durable protective coating. The instant composition utilizes a polymer, which acts as an emulsifier and does not require a separate surfactant to hold the solution in suspension as required by conventional formulations, which require a surfactant to form an emulsion.

10 Claims, No Drawings

FLEXIBLE PROTECTIVE AND LUSTROUS SPRAY GEL DRESSING COMPOSITION

RELATED APPLICATIONS

This application is related to and claims the benefit of U.S. Provisional Patent Application Ser. No. 61/123,302, filed on Apr. 7, 2008, and U.S. Provisional Patent Application Ser. No. 61/131,124, filed on Jun. 3, 2008, the entire disclosures of which are incorporated herein by reference.

TECHNICAL FIELD

The present invention relates to a spray gel protective dressing composition comprising an oil in water emulsion composed of water, silicone fluid and polymeric emulsifier.

BACKGROUND OF THE INVENTION

Care, protection and physical appearance of certain rubber, plastic, metal, and vinyl surfaces is important both to the value and longevity of the products as used for automobiles, boats, trucks, wood products, bicycles, motorcycles, etc. Of particular importance is the care, protection and appearance of vehicle components such as dashboards, door liners, seats, bumpers, and especially tires. The components usually are fabricated using polymers such as vinyl and/or rubber compounds. Tires in particular must function under relatively hostile environmental conditions which can include extreme heat, extreme cold, degrading pollutant exposure including ozone, hazardous road conditions, and the like in addition to constant flexing. Because of these environmental conditions, vehicle owners who take pride in the overall appearance of their vehicles must regularly attend to the maintenance of that appearance.

Present vehicle care products available for lustering and protecting rubber, vinyl and similar surfaces generally are compositions of a silicon-oil emulsion or silicon-oil blend in combination with a petroleum distillate solvent and chloride or fluoride carrier for application to the surface to be protected. This type of product has excellent gloss for the finished surface. While surface appearance immediately after application of prior art compositions is usually acceptable, appearance can deteriorate relatively quickly and leave blotches, streaks and an otherwise dull surface. In addition, the finished surface is usually tacky or sticky which makes it prone to attract or attach dirt and other contaminants.

Other products have been developed to coat the surface of rubber and vinyl to minimize the degradation of the material due to environmental factors and provide a durable and shiny appearance. Problems occur when the products are sprayed onto a surface such as the vinyl surface of a car door or dash and over spray results in a residue on the interior of the glass. Alternatively, the product may be a gel which cannot be as easily spray applied in cold weather and may leave too thick of a coating on the surface resulting in a slippery or greasy surface. Conventional products utilize a surfactant to maintain the dispersion and hold the composition in suspension. However, the surfactant also provides a means for migration of the silicone to the surface of the dried coating where it evaporates or becomes an oily or sticky coating attracting dirt prior to premature wear. Surfactant based dressings would re-emulsify after exposure to water and sling off from the tire surface diminishing its shine and protection.

Compositions for protecting rubber, plastic, vinyl, and the like are known in the prior art. For instance, U.S. Pat. No. 5,782,962 by Burke et al. teaches a coating composition containing a fluorine containing polymer, micronized wax, hydrocarbon solvent, organosilicone compound, surfactant and water. U.S. Pat. No. 6,013,323 by Klayder et al. teaches a silicone gel wax for metal surfaces. U.S. Pat. No. 6,685,765 by Ghodoussi teaches a composition containing a wax, ultraviolet protectant, and surfactant containing an anionic and cationic surfactant. U.S. Pat. No. 6,342,556 by Batdorf et al. utilizes submicronized zinc oxide together with an acrylic latex composition and viscosity control agent to maximize UV protection. U.S. Pat. No. 6,494,767 by Fisher teaches a composition containing micronized wax, organic solvent, emulsifier, and silicone liquid in water. U.S. Pat. Nos. 5,217,758 and 5,462,587 by Greenleaf et al. teaches the use of a polysiloxane, diluents, and micronized wax composition. U.S. Pat. No. 6,221,433 teaches an organopolysiloxane based composition for elastomeric applications. U.S. Pat. No. 6,227,200 by LeGrow teaches an alkylaryl polysiloxane copolymer composition for protecting vinyl and rubber surfaces. U.S. Pat. No. 6,933,268 by White teaches the use of a composition containing a cleaning agent, silicone, thickener, neutralizing agent, ultraviolet agent, and water. U.S. Pat. No. 5,520,843 by Wright teaches the use of a water-based emulsion of acrylic copolymer containing polyethoxylated alkylphenol and ammonium hydroxide. U.S. Pat. No. 6,206,956 by Muntz et al. teaches an organopolysiloxane emulsion based composition for protecting elastomeric surfaces. U.S. Pat. No. 5,326,387 by Faber et al. teaches the use of a volatile silicone fluid, an amino-functional silicone fluid, and an organopolysiloxane fluid to protect rubber, vinyl, and leather surfaces.

U.S. Pat. No. 6,103,323 issued in January of 2000 to D. W. Klayder et al discloses silicone gel waxes and protectants; and U.S. Pat. No. 5,700,312 issued in December of 1997 to R. L. Fausnight et al. discloses wax dispersed in a silicone liquid. The Fausnight et al. reference utilizes a micronized wax with an emulsifier in order to disperse the wax in a water/organic solvent emulsion containing a silicone liquid in both the organic and aqueous phases for application to a dry surface.

SUMMARY OF THE INVENTION

The present invention provides a surfactant free water-based spray gel composition as an oil in water emulsion which cleans, protects preserves and enhances the appearances of plastic, elastomer, rubber, and polymer surfaces used in the home or in vehicles. The product is easy to apply to both smooth and textured surfaces and has a transparent appearance. The product dries quickly and does not leave an oily residue. Utilization of select components provides a uniform deposition of the product leaving a thin film having exceptional protective properties. Unlike conventional protectants that are composed of oil-in-water or water-in-oil mixtures stabilized by surfactants (nonionic, anionic and cationic), the present invention utilizes an acrylate based anionic polymer that swells in water when a neutralizing agent is added, providing high viscosity emulsions with exceptional stability.

A water based spray gel dressing composition according to the present invention includes water, silicone fluid and a polymeric acrylic emulsifier to hold the silicone fluid dispersed in water. The dressing composition is further substantially free of surfactants.

Other objects, features, and advantages of the invention will be apparent with the following detailed description.

DESCRIPTION OF THE PREFERRED EMBODIMENT

The lustrous spray gel dressing composition of the present invention comprises a silicone fluid dispersed in water utilizing, as a dispersing aid, an acrylic emulsifying polymer. The dressing composition can further include a UV stabilizer and a reactive silane to enhance the durability of the product. Further biocides can be included, as well as fragrances.

The present composition will include generally from about 0.05 to 10% by weight of a polymeric acrylic emulsifier. In exemplary compositions, the emulsifier is present from about 0.5 to about 1% by weight, basically in an amount sufficient to maintain the silicone fluid in dispersion in water. The acrylic polymer also acts as a thickener.

One example of emulsifier contemplated herein include organic polymeric thickeners include polycarboxylate polymers having a molecular weight from about 500,000 to about 4,000,000, preferably from about 1,000,000 to about 4,000,000, with, preferably, from about 0.5% to about 4% cross linking.

One polymeric emulsifier which performs as a surfactant is available under the brand name of PEMULEN 1622. PEMULEN is a cross-linked copolymer of acrylic acid and C10-30 alkyl acrylate which is more specifically a high molecular weight copolymer of acrylic acid and a long chain alkyl methacrylate cross-linked with polyalkenyl ethers of polyalcohols containing both hydrophilic and hydrophobic portions within the molecule and designed to form stable oil in water emulsions.

This particular emulsifier has a triggered release mechanism and is sensitive to ionic strength. Upon application to the exterior of an automobile the hydrophilic portion of the polymer instantly collapses so that the emulsifier instantly de-swells upon contact with the surface characteristics and charge on the substrate body surface releasing the oil phase and providing immediate coverage of the application surface. Thus, upon contact with an ionic surface the cross-linked copolymer of acrylic acid and C10-30 alkyl acrylate collapses allowing the rapid formation of a continuous oil film phase on the application surface. Because of the lack of surfactant, the film will not easily re-emulsify nor wash off when further exposed to water providing better durability of the wax.

As reported in the Noveon Technical bulletin TDS-117 published in January of 2002, Technical Bulletin TDS-114 published in September of 1999, and Technical Bulletin PDS PEMULEN 1622 published in November of 1999 all of which are incorporated by reference herein, the instant composition utilizes an emulsifier system different from traditional emulsions which have liquid crystals comprised of oil, water and surfactants which inhibit deposition of the oil phase to the application surface. It is reported that the time lag from application to the formation o the continuous oil phase is caused by the slow evaporation of the water phase from the liquid crystal phase starting with the oil in water emulsion with water evaporation to coalesce oil droplets to form liquid crystalline gels depositing on the surface as an occlusive oil layer which takes about 90 minutes according to the information disclosed in the Noveon Technical Bulletin. Whereas the PEMULEN polymeric emulsifier results in an oil in water emulsion with water evaporation to coalesce oil droplets which deposit on the surface as an occlusive oil layer within 1 to 5 minutes omitting the liquid crystalline gels deposition step which may take up to 90 minutes after application. The time lag from application to the formation of the continuous oil phase is caused by the slow evaporation of the water phase from the liquid crystal structures.

Emulsions formed with low levels of PEMULEN water-soluble polymer emulsifiers are highly stable because the oil droplets are protected and held in suspension as a result of the high aqueous gel around each oil droplet with the hydrophobic portions of the polymer anchored in the oil phase. The lipophilic portion adsorbs at the oil-water interface and the hydrophilic portion swells in the water forming a gel network around oil droplets providing emulsion stability and does not depend on building liquid crystalline structures to provide emulsion stability.

Moreover, the oil phase in the PEMULEN, acrylates/C10-30 alkyl acrylate cross polymer emulsion spreads rapidly and is waterproof in that they cannot re-wet. In conventional emulsions, upon final evaporation of the oil phase, the oil layer contains high concentrations of surfactants rendering the oil phase readily re-emulsifiable which can result in migration of the silicon to the surface of the coating resulting in an oily or sticky surface on the coated substrate.

Up to 10% by weight of the PEMULEN can be used. Generally, from 0.01 to 10 percent by weight, more specifically from 0.01 to 8.0 percent by weight, and 0.05 to 5.0 percent by weight, can be employed. One embodiment contains 1% by weight based on the total weight of the acrylic based polymer composition based on the total weight of the functional silicone acrylic based polymer composition.

Further, SOLAGUM USPI, a polymeric acrylic emulsifier commercially available from Seppic, can also be used as an emulsifier in the present composition. This polymeric acrylate based emulsifier is sold in a pre-neutralized form, and it does not have to be neutralized during the emulsification process. This polymer thins under shear and, therefore, can be easily applied by spraying.

As the present invention is a gel formulation, it will have a viscosity of 1000 cps up to 10,000 cps, and generally from 4000 to 6000 cps. The viscosity can be controlled by selection of the appropriate acrylic emulsifier. The viscosity of acrylic emulsifiers, such as PEMULEN can be controlled by the degree of neutralization. Further, one can control the viscosity by the concentration of the acrylic polymer. The SOLAGUM polymeric acrylic emulsifier when added at a concentration of 1% provides a product generally having the viscosity of from 4000 to 6000 cps.

The dressing composition of the present invention will be substantially free of typical surfactants, anionic, cationic or nonionic. The inclusion of such surfactants will cause the applied coating to re-emulsify in the presence of water and thus decrease the durability of the dressing. Substantially free of surfactants is intended to indicate that there is an insufficient amount of surfactant present in the composition to have any significant effect upon the solubility of the silicone fluid in water. Generally, this will be less than 0.1% by weight. Certainly compositions having 0.05% by weight or less surfactant are substantially free of surfactant. However, with the present invention there is basically no reason to include any surfactant in the composition.

Examples of silicone oil (polymerized siloxane) for use in the present formulation include alkoxysilanes are polydimethylsiloxane, tetraethoxysilane, tetramethoxysilane, methyltrimethoxysilane, dimethylmethoxy-silane, phenylmethyldimethoxysilane, phenyltrimethoxysilane, and vinyltrimethoxysilane.

One or more silicon fluids such as liquid dimethyl polysiloxane is used in the present invention to aid in spreading and leveling and enhance the gloss of the product upon application. The dimethyl polysiloxane is typically obtained commercially as a silicone oil which is added to the blend of other constituents and mixed together to form the final composition. Dimethyl polysiloxane from Dow Corning is sold under the trademark 200 FLUID or from General Electric sold under the trademark SF96 polydimethylsiloxane fluid. As reported in General Electric's formulary guide at www.ge-silicones/com/silicones/americas/business/industries/fornulary-guide.shtm on February of 2002, these fluids are often characterized as amine functional fluids, however, they are actually curable polymers containing reactive alkoxy groups which upon hydrolyzation convert to silanol (OH) units. The silanol further react to form a cross-linked siloxane linkage (Si—O—Si) on the polish surface. These amine groups increase the bonding properties to the polish surface either through ionic attraction or chemical reaction. The ionic and/or chemical bond insures resistance to detergent wash-off or micro abrasion during use of the polished surface.

The selection of a silicone with a high refractive index increases the gloss, and the amount of the silicone surfactant is important in order to obtain a controlled low evaporation rate to the residual water from the treated surface. Silicone refracts light on a surface but won't evaporate like water and because of its low surface tension the silicone surfactant aids in spreading and sheeting of the final formulation leaving a thin even coating on the surface.

The amount of silicone fluid can be up to 50% by weight. More specific ranges include from 0.1 to 50 percent by weight, from 5 to 45 percent by weight, from 1 to 40 percent by weight, from 10 to 30 percent by weight, and generally from 15 to 25 percent by weight based on the total weight of the composition.

The molecular weight of the silicone fluid can be from 100 to 100,000. The higher molecular weight silicones provide a shinier dressing but are more viscous and difficult to suspend in water. Blends of different molecular weight silicones can be employed to obtain desired characteristics. One specific embodiment contains 25% by weight of 5000 CST based on the total weight of the composition.

The dressing composition may also include a UV protector. UV protectors which can be used alone or as a mixture with another UV protectors or with an anti-oxidant include the CYASORB UV series from American Cyanamid Co. (Wayne, N.J., USA) and the TIINOGARD TL series from Ciba Specialty Chemicals Co. (Basel, Switzerland). Such UV protectors may be incorporated into any relevant portion of the product, for example, in to the packaging, into or onto the gel, etc.

The stabilizers include UV filters, which are either oil or water soluble for the purpose of the present invention. In other words, anionic and nonionic, oily or oil soluble, UV filters are suitably used in the compositions of the present invention. Suitable UV-absorbing substances are: 4-Aminobenzoic acid and the esters and salts thereof, 2-phenyl benzimidazole-5sulfonic acid and the alkali and amine salts thereof, 4-dimethyl aminobenzoic acid and the esters and salts thereof, cinnamic acid and the esters and salts thereof, 4-methoxycinnamic acid and the esters and salts thereof, salicylic acid and the esters and salts thereof, 2.4dihydroxybenzophenone, 2.2 [prime].4.4 [prime]-tetrahydroxy-benzophenone, 2-hydroxy-4methoxybenzophenone and its 5-sulfonic acid or the sodium salt thereof, 2.2 [prime]-dihydroxy4.4 [prime]-dimethoxybenzophenone, 2-hydroxy-5-chlorobenzophenone, 2.2 [prime]-dihydroxy4-methoxybenzophenone, 2.2 [prime]-dihydroxy-4.4 [prime]-dimethoxy-5.5[prime] disulfobenzophenone or the sodium salt thereof, 2-hydroxy-4-octyloxybenzophenone, 2hydroxy-4-methoxy-4 [prime]-methylbenzophenone, 3-benzyl-idenecampher, 3-(4 [prime]-sulfo)benzyl-idenebomane-2-one and the salts thereof, 3-(4 [prime]-methyl benzylidene)-DL-campher and/or benzotriazolyl dodecyl p-cresol. Compositions of the present invention comprise at least one UV absorbing substance and may comprise more than one when needed. Particular UV absorbers are benzotriazolyl dodecyl p-cresol (known with the trade name Tinogard TL), whose chemical nomenclature is 2-(2H-benzotriazol-2-yl)-6-dodecyl4-phenol).

The amount of UV stabilizer or "absorber" can be up to 1% by weight, generally from 0.001 to 1 percent by weight. One particular embodiment contains 0.1% by weight based on the total weight of the composition.

A silane may also be added. The silane bonds to the coated surface, such as a tire, and provides a longer lasting shine. Generally, the silane is present in an amount 0.001 to 5.0 percent by weight, and, more typically, in ranges of from 0.01 to 2.0 percent by weight, 0.01 to 1.0 percent by weight, and 0.05 to 0.5 percent by weight based on the total weight of the composition. One particular embodiment contains 0.1 percent by weight of DC Z-6300 silane.

A biocide such as 2-bromo-2-nitropropane-1,3-diol, a broad spectrum bactericide, can be used to control microbial growth in water containing products and can be utilized in the instant formulation in amounts from 100 to 500 parts per million based on the final formulation volume, such as sold under the trade name of BIOBAN BP-PLUS by the Dow Chemical Company. The biocide improves the shelf life of the product.

The biocide preservative is added in an effective amount to preserve the wax composition product and ranges from 0.001 to 2.0 percent by weight. One particular embodiment contains 0.1 percent by weight of DANTOGARD, DMDM Hydantoin preservative supplied by Lonza Inc.

Although not required, an effective amount of one or more fragrances may be added to impart a desirable scent to the product. Generally, the fragrance is present in an amount of up to 1 percent by weight, and, more typically, of from between 0.01 to 0.50 percent by weight. One particular embodiment contains about 0.20 percent by weight based on the total weight percent of the composition.

A fragrance such as that sold under the trade name of BLUEBERRY FRAGRANCE AA 058713 available from Arylessence, Inc. in Marietta, Ga., is an exemplary fragrance. Other fragrances may be used and are also available from Arylessence, Inc. or other fragrance suppliers.

The composition is prepared by mixing the ingredients as follows wherein each ingredient is mixed well before adding the next ingredient. Add silicone fluid to water and disperse well. Add the polymeric acrylic emulsifier while mixing to thicken the mixture. Optionally a fragrance can be added at this time. Add the UV stabilizer and mix well until a translucent gel-like emulsion forms. A biocide can be added to the mixture if desired although it is not mandatory. Add the silane while mixing until completely dispersed therein. The silicone fluid droplets are suspended and completely dispersed in the composition forming a high stability emulsion and do not require shaking of the product prior application.

The spray gel product of the instant invention is applied by spraying the spray gel composition onto a dry metal, plastic, rubber or elastomeric surface and rubbing gently with tire swipes.

EXAMPLES

Preferred formulas for the spray gel composition of the present invention is set forth 20 in following examples:

Example 1

| Constituent | Commercial Name | Percent by Weight |
|---|---|---|
| DI water | Carrier phase | 73.65 |
| Polydimethylsiloxane 5000 cSt | Dispersed phase | 25.0 |
| Polymeric acrylic emulsifier | (SOLAGUM) | 1.0 |
| Fragrance | (Blueberry AA058713) | 0.1 |
| UV Stabilizer | (TINOGARD TL) | 0.05 |
| Preservative | (SURCIDE G-50) | 0.1 |
| Silane | (DC Z-6300 reactive silane) | 0.1 |

It is anticipated that the following formulations provide similar results.

Example 2

| Constituent | Commercial Name | Percent by Weight |
|---|---|---|
| DI water | Carrier phase | 73.75 |
| Polydimethylsiloxane 5000 cSt | Dispersed phase | 25.0 |
| Polymeric acrylic emulsifier | (Solagum) | 1.0 |
| Fragrance | (Blueberry AA 058713) | 0.1 |
| UV Stabilizer | (TINOGARD TL) | 0.05 |
| Preservative | (Dantogard) | 0.1 |

Example 3

| Constituent | Commercial Name | Percent by Weight |
|---|---|---|
| DI water | Carrier phase | 73.74 |
| Polydimethylsiloxane 5000 cSt | Dispersed phase | 25.0 |
| Polymeric acrylic emulsifier | (Solagum) | 1.0 |
| Fragrance | (Blueberry AA 058713) | 0.1 |
| UV Stabilizer | (TINOGARD TL) | 0.05 |
| Preservative | (Dantogard) | 0.1 |
| Dye | Chromatint Violet X-2214 | 0.01 |

The present invention is a high viscosity oil-in-water emulsion that provides a longer lasting lustrous surface appearance, particularly on solid polymeric surfaces, in particular elastomeric surfaces such as tires. Because of its shear-thinning ability it can be applied by spraying.

The dressing composition can be applied to a surface, such as a tire surface, using manual spray applicators such as pump sprayers or trigger sprayers. This can be applied onto the surface, such as a tire. Electrolytes on the surface of the tire, as well as physical interaction between, for example, a sponge and the tire surface, will cause the acrylic emulsifier to collapse, releasing the silicone oil. The polymer does not reabsorb the oil, leaving basically the silicone oil on the surface of the tire. This provides a very lustrous appearance. Because no surfactants are present, this lustrous appearance lasts longer even when exposed to water. Further, because this is an oil-in-water system, there is no solvent carrier present, and, accordingly, it has no VOCs.

This has been a general description of the present invention; however, the invention should be defined by the appended claims, wherein We claim:

1. A spray gel dressing composition free of surfactants and having a viscosity of 1000 to 10,000 cps comprising water in an amount of at least 60 percent by weight based on the total weight of the composition; at least 25% by weight silicone fluid based on the total weight of the composition; and a polymeric acrylic emulsifier in an amount of from 0.001 to 10.0 percent by weight based on the total weight of the composition.

2. The spray gel dressing composition of claim 1 having a viscosity of 4000 to 6000 cps.

3. The spray gel composition of claim 1, further comprising a UV stabilizer in an amount of from 0.01 to 1.0 percent by weight based on the total weight of the composition.

4. The spray gel composition of claim 1, further comprising a preservative in an amount of from 0.001 to 1.0 percent by weight based on the total weight of the composition.

5. The spray gel composition of claim 1, further comprising a silane in an amount of from 0.001 to 1.0 percent by weight based on the total weight of the composition.

6. The spray gel composition of claim 1, further comprising a fragrance in an amount of from 0.001 to 1.0 percent by weight based on the total weight of the composition.

7. A spray gel dressing composition free of surfactants having a viscosity of 1000 to 10,000 cps consisting essentially of water, at least 25% by weight silicone fluid based on the total weight of the composition;
   a polymeric acrylic emulsifier in an amount from 0.001 to 10% by weight based on the total weight of the composition;
   a UV stabilizer in an amount from 0.001 to 1% by weight based on the total weight of the composition;
   a preservative in an amount from 0.0 to 1% by weight based on the total weight of the composition;
   a silane in the amount of from 0.01 to 1% by weight based on the total weight of the composition; and
   a fragrance in an amount from 0.0 to 1% by weight based on the total weight of the composition.

8. The spray gel dressing claimed in claim 7 having a viscosity of 4000 to 6000 cps.

9. A solid polymeric surface coated with a spray gel dressing composition of claim 1.

10. The surface claimed in claim 9 wherein said surface is a tire.

* * * * *